(12) United States Patent
Nematollahi

(10) Patent No.: US 7,790,252 B2
(45) Date of Patent: Sep. 7, 2010

(54) ARMORING DEVICE FOR PROTECTING AN OBJECT

(76) Inventor: Khosrow Nematollahi, 1130 Helford La., Carmel, IN (US) 46032

( * ) Notice: Subject to any disclaimer, the term of this patent is extended or adjusted under 35 U.S.C. 154(b) by 312 days.

(21) Appl. No.: 11/970,551

(22) Filed: Jan. 8, 2008

(65) Prior Publication Data

US 2008/0171166 A1 Jul. 17, 2008

Related U.S. Application Data

(60) Provisional application No. 60/884,752, filed on Jan. 12, 2007.

(51) Int. Cl.
*B32B 1/08* (2006.01)
*B29D 22/00* (2006.01)
*F16L 11/04* (2006.01)
*F16L 11/08* (2006.01)
*B32B 15/04* (2006.01)
*B32B 27/00* (2006.01)

(52) U.S. Cl. .................. 428/34.7; 428/35.7; 428/36.91; 428/36.2; 428/457; 428/423.1

(58) Field of Classification Search ............... 428/36.9, 428/34.7, 35.7, 36.91, 36.2, 689, 702, 457, 428/423.1; 89/36.01
See application file for complete search history.

(56) References Cited

U.S. PATENT DOCUMENTS 5,221,807 A * 6/1993 Vives ........................ 89/36.02

6,497,966 B2 * 12/2002 Cohen ........................ 428/626

FOREIGN PATENT DOCUMENTS

EP 1046878 A1 * 10/2000

OTHER PUBLICATIONS

Machine Translation of EP 1046878 A1; Oct. 2000.*
Jones, Tyrone; Dynamic Conditioning of Projectiles for Ultra-Lightweight Armor Applications; Department of Defense Small Business Innovation Research (DoD SBIR); May 19, 2010; Program SBIR, Topic No. A10-057 (Army); http://www.dodsbir.net/Topics/BasicTopicsResultsForm.asp.

* cited by examiner

*Primary Examiner*—Rena L Dye
*Assistant Examiner*—James Yager
(74) *Attorney, Agent, or Firm*—Ronald K. Aust

(57) ABSTRACT

A multi-layer device having a plurality of primary layers for protecting an object includes a first primary layer formed from a first ceramic material. A second primary layer is positioned over the first primary layer, the second primary layer being formed from a first plastic material. A third primary layer is positioned over the second primary layer, the third primary layer being formed from metal. A fourth primary layer is positioned over the third primary layer, the fourth primary layer being formed from a second plastic material. A fifth primary layer is positioned over the fourth layer, the fifth primary layer being formed from a second ceramic material. A sixth primary layer is positioned over the fifth primary layer. The sixth primary layer includes a plurality of sub-layers, with each sub-layer being formed as a plurality of secondary layers, and with each secondary layer being a composite polymer-fabric.

19 Claims, 7 Drawing Sheets

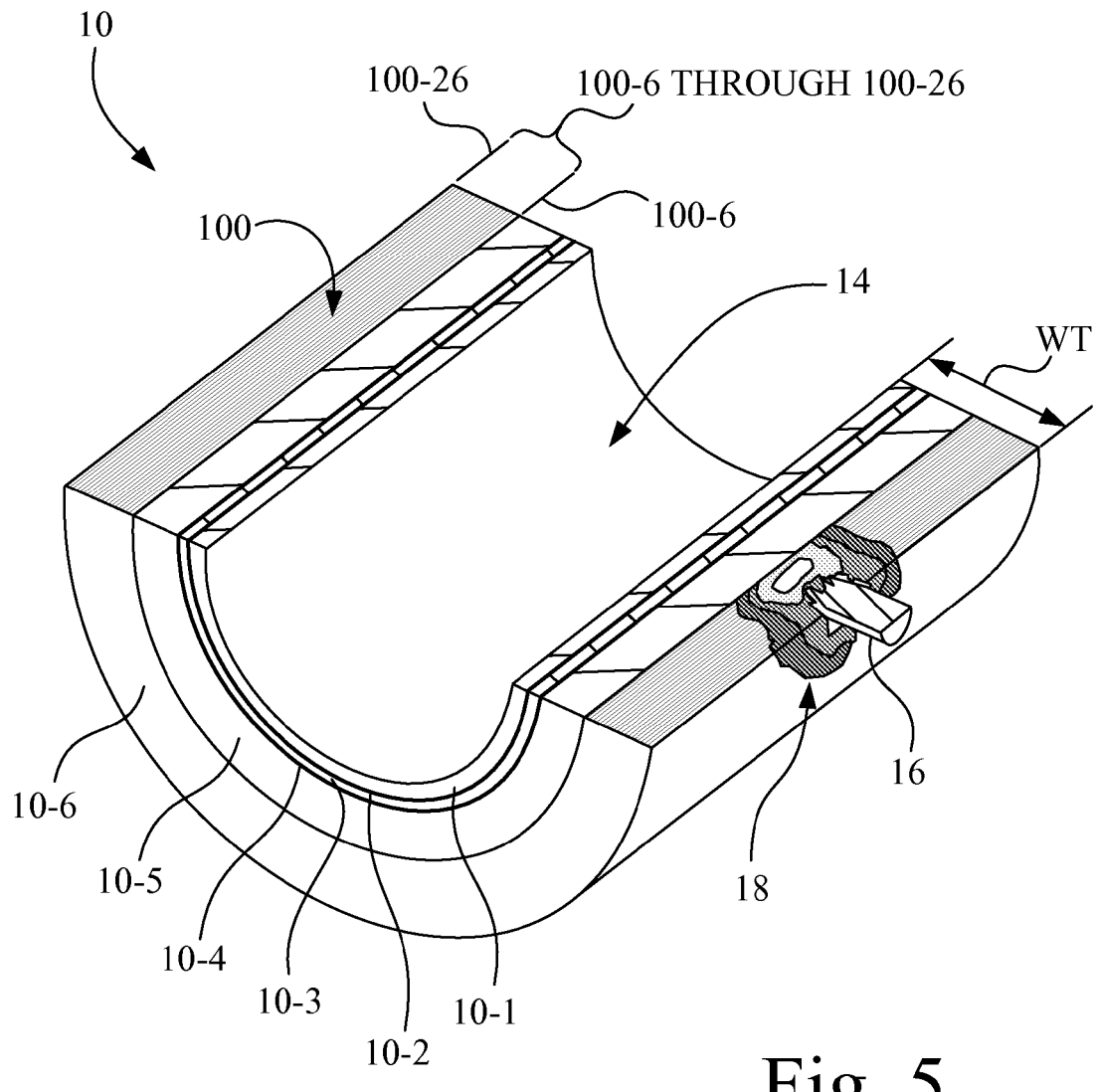
Fig. 5
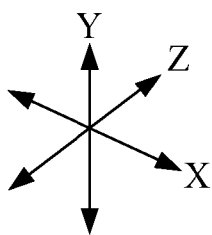

ARMORING DEVICE FOR PROTECTING AN OBJECT

CROSS-REFERENCE TO RELATED APPLICATIONS

This is a non-provisional application based upon U.S. provisional patent application Ser. No. 60/884,752, entitled "PROTECTIVE DEVICE FOR INSENSITIVE MUNITIONS", filed Jan. 12, 2007.

GOVERNMENT RIGHTS IN PATENT

The invention described herein was made with the proceeds from government contract no. HQ0006-06-C-7488. The U.S. government may have certain rights in this patent.

MICROFICHE APPENDIX

None.

BACKGROUND OF THE INVENTION

1. Field of the Invention

The present invention relates to protective containers and panels, and, more particularly, to an armoring device for protecting an object, such as for example, insensitive munitions.

2. Description of the Related Art

Insensitive munitions are munitions which are designed to minimize the likelihood of inadvertent detonation. Notwithstanding, insensitive munitions may be vulnerable to intentional acts of destruction, such as an impact by a projectile such as a bullet or shrapnel from an explosive device. Federal law requires that the Department of Defense (DoD) munitions programs comply with insensitive munitions (IM) criteria.

There has recently been an increased emphasis on compliance with IM standards in an effort to improve the safety of explosives and energetic materials. Military products are manufactured, shipped and stored at various locations throughout the world. The increasing threat of terrorist attacks on military installations and public infrastructure has driven all branches of the military to assess the safety of the systems and products under their area of responsibility.

SUMMARY OF THE INVENTION

The invention, in one form thereof, is directed to a multi-layer device having a plurality of primary layers for protecting an object. The multi-layer device includes a first primary layer formed from a first ceramic material. A second primary layer is positioned over the first primary layer, the second primary layer being formed from a first plastic material. A third primary layer is positioned over the second primary layer, the third primary layer being formed from metal. A fourth primary layer is positioned over the third primary layer, the fourth primary layer being formed from a second plastic material. A fifth primary layer is positioned over the fourth layer, the fifth primary layer being formed from a second ceramic material. A sixth primary layer is positioned over the fifth primary layer. The sixth primary layer includes a plurality of sub-layers, with each sub-layer being formed as a plurality of secondary layers, and with each secondary layer being a composite polymer-fabric.

The invention, in another form thereof, is directed to a multi-layer device having a plurality of primary layers for protecting an object. The multi-layer device includes a first primary layer formed from a first ceramic material. A second primary layer is positioned over the first primary layer, the second primary layer being formed from a first polyurethane material. A third primary layer is positioned over the second primary layer, the third primary layer being formed from one of stainless steel and aluminum. A fourth primary layer is positioned over the third primary layer, the fourth primary layer being formed from a second polyurethane material. A fifth primary layer is positioned over the fourth layer, the fifth primary layer being formed from a second ceramic material. A sixth primary layer is positioned over the fifth primary layer. The sixth primary layer includes a plurality of sub-layers, with each sub-layer being formed as a plurality of secondary layers, and with each secondary layer being a Kevlar fabric impregnated with polyurethane.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 3, 4, 5, and 6 are cross-sectional views of the protective device of FIG. 1, taken along line 3-3 of FIG. 2, showing various stages of a simulated impact of a projectile, such as a 0.50 caliber bullet.

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION OF THE INVENTION

The invention addresses insensitive munitions (IM) threats during a traditional munitions lifecycle, which can include deployment and/or transportation by sea, land and air.

The present invention improves compliance for ordnance and energetic material. IM compliance and hazard classification testing addresses the safety of the product relative to transportation, storage, and system vulnerability over the entire life cycle of the product. Examples of standards for IM compliance include STANAG 4375, STANAG 4396, STANAG 4439, STANAG 4382, STANAG 4241, MIL-STD-2105, and MIL-STD-2105B.

In short, the invention is directed to a multilayered protective device formed by a polymer-ceramic-fabric-thick glue-powder coating composite structure to provide a protective shield against projectiles, such as bullets, shrapnel, etc. The present invention provides insensitive munitions packaging which may be applied to protect, for example, missiles or solid rocket motors from unplanned stimuli such as heat, shock and bullet/fragment impact. Current simulation models show that bullet and fragment temperatures are higher than the propellant igniting temperature. It also has been found that due to current highly conductive material used in solid rocket motors (SRMs), the inside temperature is higher than igniting temperature of propellant due to the high rate of fast cook off radiation force and high conductive properties. SRMs react to fire flame fast cook off and oven slow cook off.

Figure 1:
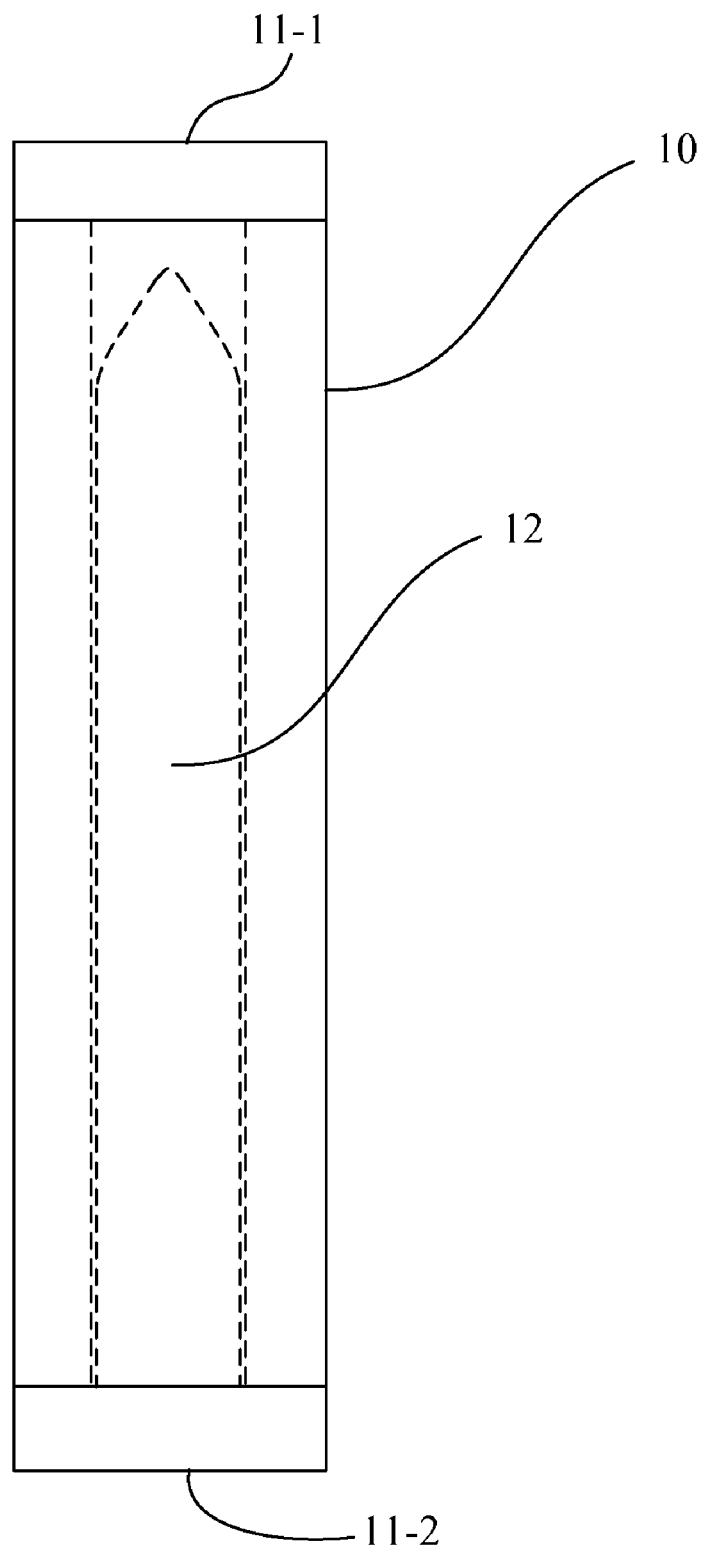
FIG. 1 is a side diagrammatic view of a protective device in accordance with an embodiment of the present invention.
Figure 2:
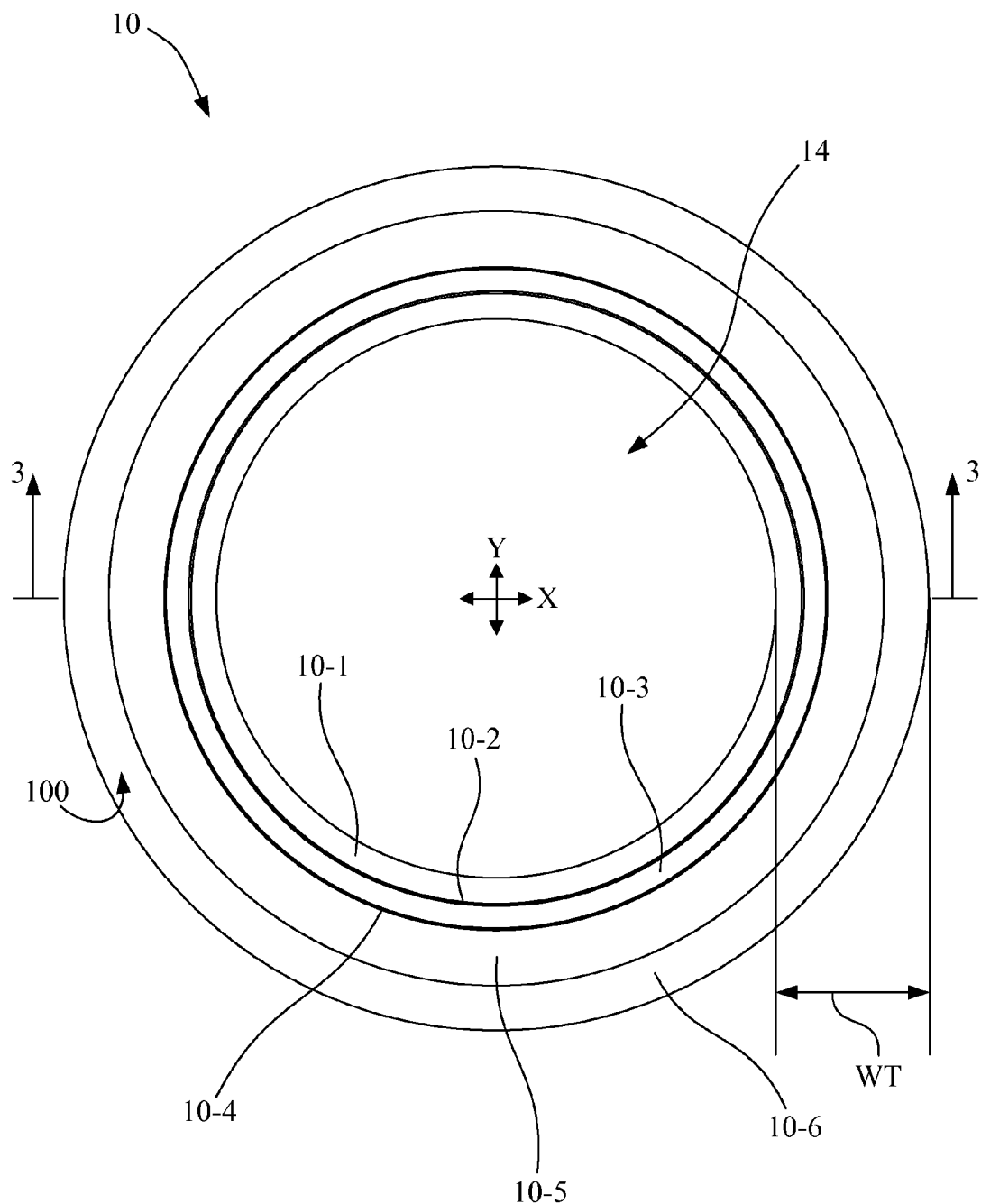
FIG. 2 is an end view of the protective device of FIG. 1 showing the various primary layers (not to scale).

Referring now to FIGS. 1 and 2, there is shown a diagrammatic illustration of an embodiment of a protective device 10 for protecting an object 12, such as insensitive munitions, in accordance with an embodiment of the present invention, by placing object 12 into an inner hollow core 14 of protective device 10. End caps 11-1 and 11-2 may be constructed similar to that of protective device 10. The insensitive munitions 12 may be, for example, a missile or rocket motor or body, and which may have a diameter of seven inches or greater.

As illustrated in FIG. 2, protective device 10 includes six primary layers, labeled 10-1, 10-2, 10-3, 10-4, 10-5 and 10-6, formed as concentric cylinders. In this embodiment, referring also to FIG. 3, the outermost primary layer 10-6 includes a plurality of sub-layers 100, individually identified as sub-layers 100-6 through 100-26. Protective device 10 has an overall wall thickness WT that is in the X-Y plane, as illustrated in FIGS. 2-6. Individual wall thicknesses of primary layers 10-1, 10-2, 10-3, 10-4, 10-5 and 10-6 in the X-Y plane combine to form the overall wall thickness WT of protective device 10.

FIGS. 3, 4, 5, and 6 show various stages of a simulated impact of a projectile 16, such as a 0.50 caliber armor piercing bullet, with protective device 10 configured as the specific example described above. Contours of effective stress 18 are shaded to signify various stress levels as a result of the impact by projectile 16, with stress levels from highest to lowest signified by shading of lightest to darkest, respectively.

Figure 3:
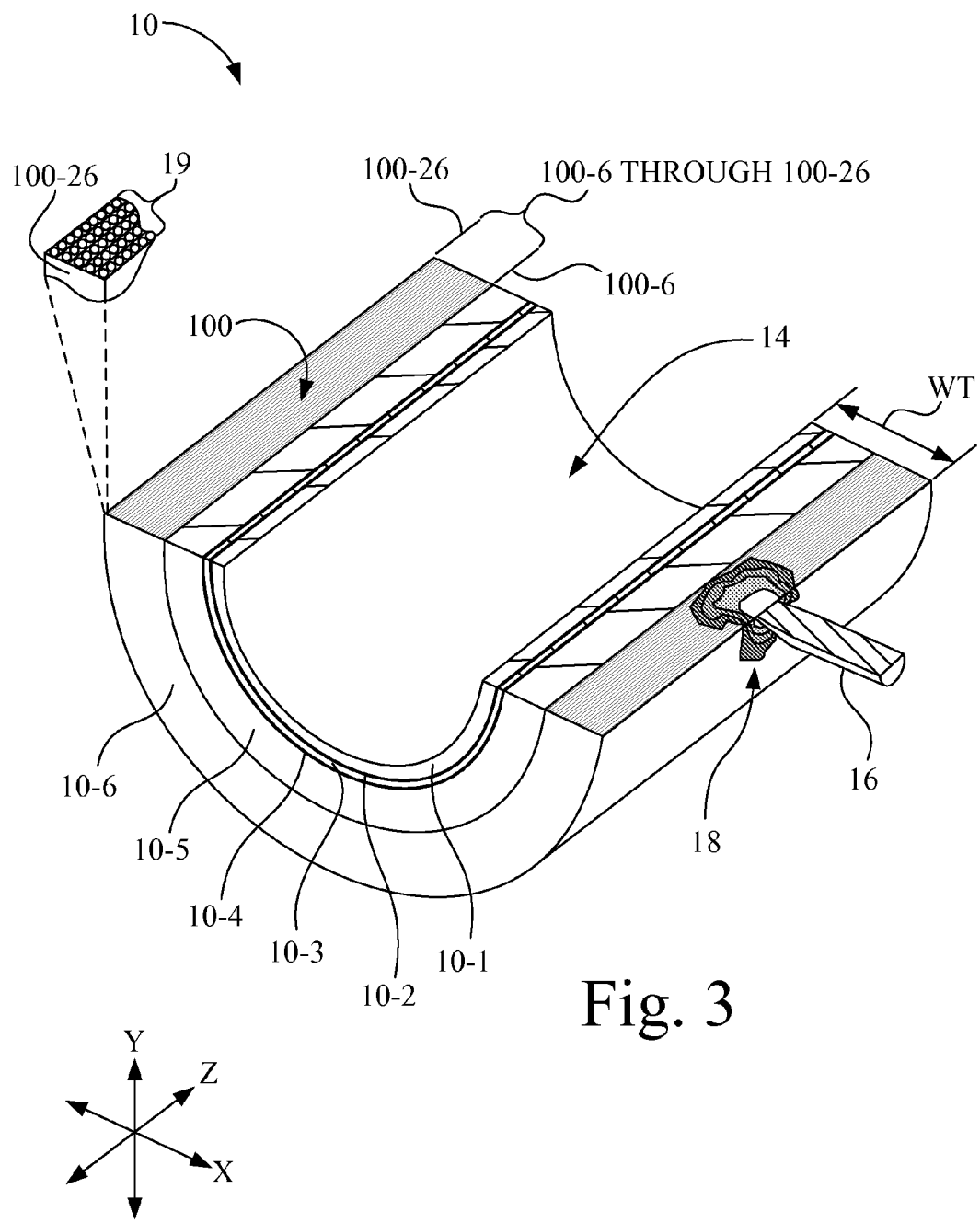
Figure 4:
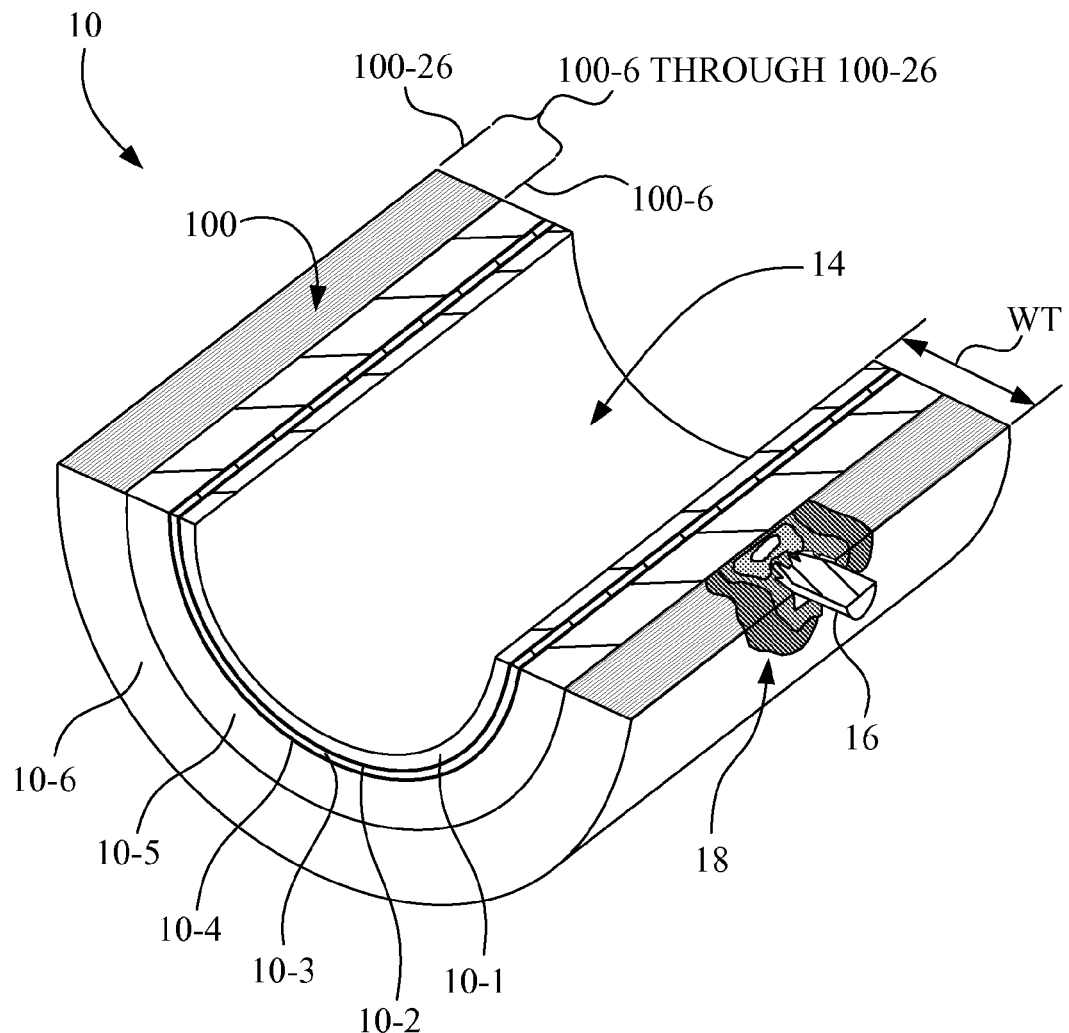
Figure 6:
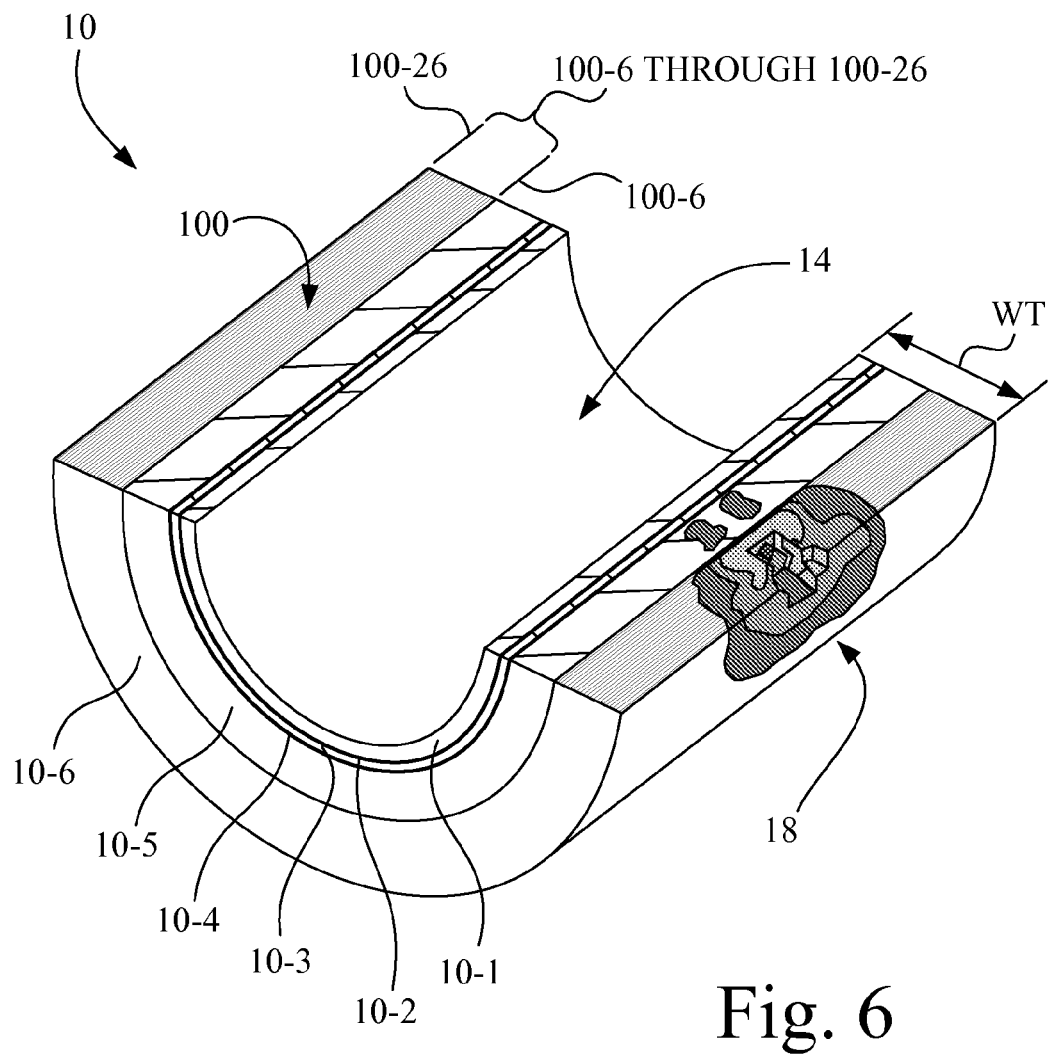
Figure 6:
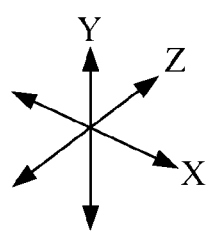

FIG. 3 shows an initial impact of projectile 16 with the outermost primary layer 10-6. FIG. 4 shows the impact of projectile 16 at $1/25000$ of a second following the initial impact of projectile 16 with the outermost primary layer 10-6. FIG. 5 shows the impact of projectile 16 at $1/10000$ of a second following the initial impact of projectile 16 with the outermost primary layer 10-6. FIG. 6 shows that at $1/1000$ of a second following the initial impact of projectile 16 with the outermost primary layer 10-6, the projectile, e.g., bullet, 16 is destroyed without the bullet penetrating into the inner hollow core 14 internal to primary layer 10-1, and thus, the bullet would not reach the insensitive munitions 12 illustrated as a missile body in FIG. 1.

In accordance with the present invention, the following is a general description of the various layers forming protective device 10. Several considerations were made with respect to the various layers forming protective device 10, such as load limits, bullet penetration, fragment impact, fuel jet flame fast cook off, and in-oven slow cook off.

In the embodiment of FIGS. 1 and 2, primary layer 10-1 is formed by an inner ceramic cylinder with an inside diameter of greater than six inches, e.g., seven inches to 100 inches, defining inner hollow core 14. Primary layer 10-1 has a wall thickness in a range of 0.4 inches to 1.0 inches. While the inner ceramic layer 10-1 may crack due to the impact of projectile 16 on the protective device 10, such as a 0.50 caliber bullet, the inner ceramic layer 10-1 will not be destroyed.

Primary layer 10-2 is a plastic, e.g., polyurethane, layer that is wrapped around, i.e., positioned over, the inner ceramic cylinder formed by primary layer 10-1. Primary layer 10-2 has a wall thickness in the range of 0.010 inches to 0.060 inches. At $1/10000$ of a second (see FIG. 5) after initial impact of a projectile 16 with protective device 10, the inner polymer layer 10-2 absorbs a substantial portion of the projectile 16, e.g., bullet, kinetic energy and converts it to internal energy in forms of deformation and thermal energy.

Primary layer 10-3 is a hard metal, e.g., stainless steel, cylinder positioned around, i.e., over, primary layer 10-2. Primary layer 10-3 has a wall thickness in the range of 0.25 inches to 2.0 inches.

Primary layer 10-4 is a plastic, e.g., polyurethane, layer wrapped around, i.e., positioned over, the exterior of the stainless steel cylinder of layer 10-3. Primary layer 10-4 has a wall thickness in the range of 0.010 inches to 0.060 inches. The internal energy (strain energy) of the outer polymer layer 10-4 goes very high at $1/10000$ of a second (see FIG. 5) after initial impact of a projectile 16 with protective device 10.

Primary layer 10-5 is an outer ceramic cylinder positioned around, i.e., over, primary layer 10-4. Primary layer 10-5 has a wall thickness in the range of 0.5 inches to 2.0 inches. At $1/10000$ of a second (see FIG. 5) after initial impact of a projectile 16 with protective device 10, the outer ceramic layer 10-5 is destroyed by showing high distortion energy.

Primary layer 10-6 is positioned over primary layer 10-5. Primary layer 10-6 includes the plurality of sub-layers 100, e.g., sub-layers 100-6 through 100-26, with each sub-layer composed of a plurality of secondary layers 19, e.g., three to seven secondary layers, of a composite polymer-fabric, e.g., a Kevlar® fabric impregnated with polyurethane, which is also referred to herein as "Kevlar polymer fabric". "Kevlar" is a trademark registered to E. I. du Pont de Nemours and Company. Each of the sub-layers 100-6 through 100-26 of this composite polymer-fabric has a wall thickness in the range of 0.020 inches to 0.060 inches. Therefore, the total wall thickness of primary layer 10-6 for all twenty-one of the plurality of sub-layers 100-6 through 100-26 is approximately 0.420 inches to 1.26 inches. Upon impact (see FIGS. 3-6), the outer Kevlar polymer fabric layers (e.g., sub-layer 100-26 down to sub-layer 100-12) are penetrated, burned and destroyed at the point of impact by having very high Hourglass energy. Some energy is also absorbed in the form of internal and thermal energy.

The following is one specific configuration for protective device 10. The example that follows includes 26 concentric cylindrical layers composed of the materials ceramic, polyurethane, stainless steel or other higher strength metals (e.g., high strength aluminum), and composite polymer-fabrics, e.g., Kevlar polymer fabrics, in the following manner.

Primary layer 10-1 is formed by an inner ceramic cylinder with an inside diameter of 10 inches and having a wall thickness of 0.460 inches.

Primary layer 10-2 is a polyurethane layer that is 0.040 inches thick and is wrapped around, i.e., positioned over, the inner ceramic cylinder of primary layer 10-1.

Primary layer 10-3 is a stainless steel cylinder with an inside diameter of 11.2 inches and with a wall thickness of 0.40 inches, and is positioned over primary layer 10-2.

Primary layer 10-4 is a polyurethane layer wrapped around, i.e., positioned over, the exterior of the stainless-steel cylinder of primary layer 10-3. The outer diameter of the stainless steel is 11.90 inches and the wall thickness of the polyurethane is 0.030 inches.

Primary layer 10-5 is an outer ceramic cylinder with an inside diameter of 12 inches and a wall thickness of 0.875 inches, and is positioned over primary layer 10-4.

Primary layer 10-6 includes sub-layers 100-6 through 100-26, positioned over primary layer 10-5. In the present embodiment, each sub-layer of sub-layers 100-6 through 100-26 is composed of five secondary layers of composite polymer-fabric, e.g., Kevlar fabric impregnated with polyurethane (i.e., five Kevlar polymer fabric layers). Each of the sub-layers 100-6 through 100-26 of this composite polymer-fabric has a wall thickness of approximately 0.040 inches, and therefore the total for all twenty-one layers is approximately 0.8 inches.

The following is another specific configuration for protective device 10. The example that follows includes the six primary layers 10-1, 10-2, 10-3, 10-4, 10-5 and 10-6, composed of the materials ceramic, polyurethane, steel (e.g., stainless steel) or other higher strength metals (e.g., high strength aluminum), and composite polymer-fabrics, e.g., Kevlar polymer fabrics, in the following manner.

Primary layer 10-1 is formed by an inner ceramic cylinder with an inside diameter of 9.9 inches and having a wall thickness of 0.50 inches.

Primary layer 10-2 is a polyurethane layer that is 0.050 inches thick and is wrapped around, i.e., positioned over, the inner ceramic cylinder of primary layer 10-1.

Primary layer 10-3 is a steel cylinder with an inside diameter of 11 inches and with a wall thickness of 0.50 inches, and is positioned over primary layer 10-2.

Primary layer 10-4 is a polyurethane layer wrapped around, i.e., positioned over, the exterior of the stainless-steel cylinder of primary layer 10-3. The outer diameter of the steel is 12 inches and the wall thickness of the polyurethane is 0.050 inches.

Primary layer 10-5 is an outer ceramic cylinder with an inside diameter of 12.1 inches and a wall thickness of 1.0 inches, and is positioned over primary layer 10-4.

Primary layer 10-6 includes a plurality of sub-layers 100, positioned over primary layer 10-5. In the present embodiment, each sub-layer of the plurality of sub-layers 100 is composed of a plurality of secondary layers 19 of composite polymer-fabric, e.g., Kevlar fabric impregnated with polyurethane (i.e., five Kevlar polymer fabric layers), which combine to form a wall thickness of primary layer 10-6 of approximately 0.5 inches.

Figure 7:
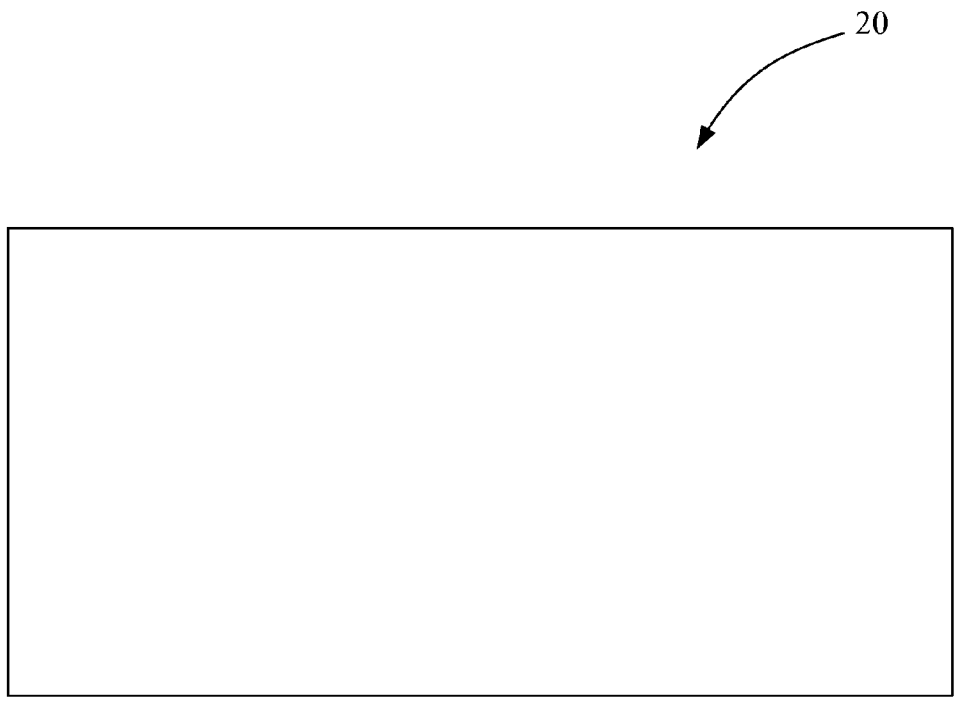
FIGS. 7 and 8 shows in a top view and a side view, respectively, another embodiment of a protective device formed as a multi-layered plate.
Figure 8:
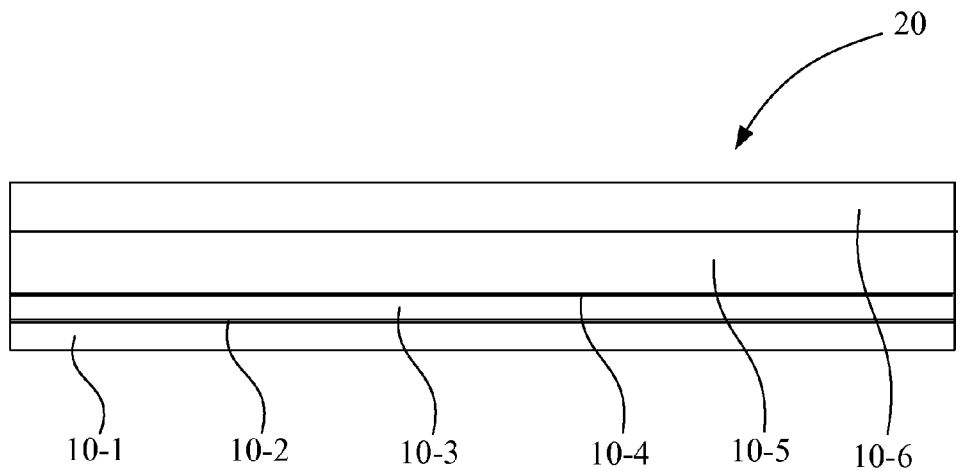

The examples of a protective device in accordance with various embodiments of the invention as set forth above and shown in FIGS. 1-6 have a cylindrical configuration. Shown in FIGS. 7 and 8 is another embodiment of a protective device in accordance with the present invention, identified as protective device 20. Protective device 20 is formed as a multi-layered plate including material layers corresponding to primary layers 10-1, 10-2, 10-3, 10-4, 10-5 and 10-6 described above. In the embodiment as shown, the multi-layered plate has a rectangular top view shape, although those skilled in the art will recognize that the plate may be of other polygonal, regular (e.g., circle, oval, etc.), or irregular shapes. Also, in the embodiment as shown, the plate is formed as a flat arrangement of the layers, although those skilled in the art will recognize that the plate may be curved, i.e., having a curved profile, similar to the configuration of the embodiments shown in FIGS. 2-6. Protective device 20 may be used, for example, to reinforce structure, such as to provide protective coverings for vehicle bodies, buildings, electronic equipment, etc.

The invention as described above with respect to several embodiments may be readily adapted for use in a variety of applications. Some such applications include, without limitation:

a) military vehicles, planes, trains, missiles, gas generators, explosive weapons, and energetic weapons that require Insensitive Munitions (IM) Compliance;

b) commercial transportation such as planes, helicopters, trains and busses that need to be secure from sniper attack;

c) homeland security vehicles and buildings;

d) government buildings; and e) presidential and other high-ranking official motorcades.

The present invention provides a protective device that will allow explosive devices to pass the bullet and/or fragment-impact portion of the IM compliance testing. It can provide a safer environment for the transportation and storage of explosives and energetic materials. This technology may be applied directly to the existing shipping containers for the entire countermeasure instead of just the explosive device. This may result in cost savings for shipping, tracking and logistics. With minor modifications, this technology may be customized for other weapon systems requiring Insensitive Munitions (IM) compliance.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A multi-layer device having a plurality of primary layers for protecting an object, comprising:

a first primary layer formed from a first ceramic material, said first primary layer being positioned closest to said object of said plurality of primary layers, said first primary layer having a first thickness;

a second primary layer positioned over said first primary layer, said second primary layer being formed from a first plastic material and configured to undergo deformation to absorb energy, said second primary layer having a second thickness in a range of 0.020 inches to 0.060 inches;

a third primary layer positioned over said second primary layer, said third primary layer being formed from metal, said third primary layer having a third thickness;

a fourth primary layer positioned over said third primary layer, said fourth primary layer being formed from a second plastic material and configured to undergo deformation to absorb energy, said fourth primary layer having a fourth thickness in a range of 0.020 inches to 0.060 inches;

a fifth primary layer positioned over said fourth layer, said fifth primary layer being formed from a second ceramic material, said fifth primary layer having a fifth thickness; and a sixth primary layer positioned over said fifth primary layer, said sixth primary layer serving as an outer layer of said plurality of primary layers, said sixth primary layer including a plurality of sub-layers, with each sub-layer being formed as a plurality of secondary layers, and with each secondary layer being a composite polymer-fabric, said sixth primary layer formed from said plurality of sub-layers of said plurality of secondary layers of said composite polymer-fabric having a sixth thickness in a range of 0.420 inches to 1.26 inches, wherein an outermost secondary layer of said sixth primary layer will receive an initial impact by an armor piercing projectile and with a portion of said plurality of sub-layers of said sixth primary layer contributing sacrificially to substantially absorb stress exerted by said armor piercing projectile at said sixth primary layer prior to said projectile reaching said fifth primary layer of said second ceramic material, said plurality of primary layers being located sequentially in the order of said first primary layer, said second primary layer, said third primary layer, said fourth primary layer, said fifth primary layer, and said sixth primary layer.

2. The multi-layer device of claim 1, wherein each of said first plastic material of said second primary layer and said second plastic material of said fourth primary layer is a polyurethane material.

3. The multi-layer device of claim 1, wherein said third primary layer is formed from one of stainless steel and aluminum.

4. The multi-layer device of claim 1, wherein said composite polymer-fabric is an aramid fabric impregnated with polyurethane.

5. The multi-layer device of claim 4, wherein each sub-layer includes three to seven secondary layers.

6. The multi-layer device of claim 5, wherein said sixth primary layer includes twenty-one sub-layers.

7. The multi-layer device of claim 1, wherein said first primary layer, said second primary layer, said third primary layer, said fourth primary layer, said fifth primary layer and said sixth primary layer are configured as concentric cylindrical layers, arranged from inside toward outside with said first primary layer being an innermost layer of said plurality of primary layers and successively proceeding to said sixth primary layer of said plurality of primary layers.

8. The multi-layer device of claim 7, wherein said first primary layer has an inside diameter greater than six inches and said first primary layer has said first thickness in a range of 0.4 inches to 1.0 inches, said third primary layer has said third thickness in a range of 0.25 inches to 2.0 inches, and said fifth primary layer has said fifth thickness in a range of 0.5 inches to 2.0 inches.

9. The multi-layer device of claim 7, wherein said first primary layer has an inside diameter in a range of seven inches to 100 inches.

10. The multi-layer device of claim 1, wherein said object is one or more insensitive munitions.

11. The multi-layer device of claim 1, wherein said object is at least one of personnel, a vehicle body, a building and electronic equipment.

12. The multi-layer device of claim 1, wherein said plurality of primary layers are configured as a multi-layered plate, with said plurality of primary layers arranged in order from said first primary layer to said sixth primary layer, and wherein said object is located closest to said first primary layer.

13. The multi-layer device of claim 12, wherein said multi-layered plate in a top view has a shape that is one polygonal, circular, and oval.

14. The multi-layer device of claim 12, wherein said multi-layered plate has a curved profile.

15. A multi-layer device having a plurality of primary layers for protecting an object, comprising:
    a first primary layer formed from a first ceramic material, said first primary layer being positioned closest to said object of said plurality of primary layers, said first primary layer having a first thickness;
    a second primary layer positioned over said first primary layer, said second primary layer being formed from a second polyurethane material and configured to undergo deformation to absorb energy, said second primary layer having a second thickness in a range of 0.020 inches to 0.060 inches;
    a third primary layer positioned over said second primary layer, said third primary layer being formed from one of stainless steel or aluminum, said third primary layer having a third thickness;
    a fourth primary layer positioned over said third primary layer, said fourth primary layer being formed from a second polyurethane material and configured to undergo deformation to absorb energy, said fourth primary layer having a fourth thickness in a range of 0.020 inches to 0.060 inches;
    a fifth primary layer positioned over said fourth layer, said fifth primary layer being formed from a second ceramic material, said fifth primary layer having a fifth thickness; and
    a sixth primary layer positioned over said fifth primary layer, said sixth primary layer serving as an outer layer of said plurality of primary layers, said sixth primary layer including a plurality of sub-layers, with each sub-layer being formed as a plurality of secondary layers, and with each secondary layer being an aramid fabric impregnated with polyurethane, said sixth primary layer formed from said plurality of sub-layers of said plurality of secondary layers of said Kevlar fabric impregnated with polyurethane having a sixth thickness in a range of about 0.5 inches to about 0.8 inches, wherein an outermost secondary layer of said sixth primary layer will receive an initial impact by an armor piercing projectile and with a portion of said plurality of sub-layers of said sixth primary layer contributing sacrificially to substantially absorb stress exerted by said armor piercing projectile at said sixth primary layer prior to said projectile reaching said fifth primary layer of said second ceramic material,
    said plurality of primary layers being located sequentially in the order of said first primary layer, said second primary layer, said third primary layer, said fourth primary layer, said fifth primary layer, and said sixth primary layer.

16. The multi-layer device of claim 15, wherein said first primary layer, said second primary layer, said third primary layer, said fourth primary layer, said fifth primary layer and said sixth primary layer are configured as concentric cylindrical layers, arranged from inside toward outside with said first primary layer being an innermost layer and successively proceeding to said sixth primary layer.

17. The multi-layer device of claim 16, wherein said first primary layer has an inside diameter in a range of seven to 100 inches.

18. The multi-layer device of claim 15, wherein said first primary layer has said first thickness in a range of about 0.46 inches to about 0.5 inches, said second primary layer has said second thickness in a range of about 0.04 inches to about 0.05 inches, said third primary layer has said third thickness in a range of about 0.4 inches to about 0.5 inches, said fourth primary layer has said fourth thickness in a range of about 0.030 inches to about 0.050 inches, and said fifth primary layer has said fifth thickness in a range of about 0.875 inches to about 1.0 inches.

19. The multi-layer device of claim 18, wherein said plurality of primary layers are configured as a multi-layered plate.

* * * * *